(12) United States Patent
D'Amico

(10) Patent No.: US 10,562,552 B2
(45) Date of Patent: Feb. 18, 2020

(54) SYSTEM FOR RAILWAY MONITORING

(71) Applicant: Current Lighting Solutions, LLC, East Cleveland, OH (US)

(72) Inventor: Bruno D'Amico, Lachine (CA)

(73) Assignee: CURRENT LIGHTING SOLUTIONS, LLC, East Cleveland, OH (US)

(*) Notice: Subject to any disclaimer, the term of this patent is extended or adjusted under 35 U.S.C. 154(b) by 112 days.

(21) Appl. No.: 15/701,697

(22) Filed: Sep. 12, 2017

(65) Prior Publication Data

US 2019/0077429 A1    Mar. 14, 2019

(51) Int. Cl.
| | |
|---|---|
| G06K 9/00 | (2006.01) |
| B61L 23/34 | (2006.01) |
| B61L 23/04 | (2006.01) |
| G06T 7/20 | (2017.01) |
| B61L 23/00 | (2006.01) |
| B61L 29/30 | (2006.01) |

(52) U.S. Cl.
CPC .......... *B61L 23/041* (2013.01); *B61L 23/007* (2013.01); *B61L 29/30* (2013.01); *G06T 7/20* (2013.01)

(58) Field of Classification Search
USPC ....... 382/100, 103–104, 106, 155, 162, 168, 382/178, 181, 199, 209, 232, 254, 276, 382/286–294, 305, 317; 246/473.1, 125, 246/122
See application file for complete search history.

(56) References Cited

U.S. PATENT DOCUMENTS

| | | | | |
|---|---|---|---|---|
| 5,825,412 | A |  10/1998 | Hobson et al. | |
| 9,376,129 | B2 * | 6/2016 | Hilleary | B61L 27/00 |
| 2002/0185571 | A1 * | 12/2002 | Bryant | B61L 29/08 |
| | | | | 246/125 |
| 2012/0181390 | A1 * | 7/2012 | Ashraf | B61L 29/22 |
| | | | | 246/122 R |
| 2014/0339374 | A1 * | 11/2014 | Mian | G08G 1/0175 |
| | | | | 246/473.1 |
| 2015/0323663 | A1 | 11/2015 | Lehnertz | |
| 2016/0189552 | A1 * | 6/2016 | Hilleary | G08G 7/02 |
| | | | | 246/125 |

FOREIGN PATENT DOCUMENTS

WO    2014/059487 A1    4/2014

OTHER PUBLICATIONS

International Search Report and Written Opinion issued in connection with corresponding PCT Application No. PCT /US2018/ 043020 dated Nov. 7, 2018.

* cited by examiner

*Primary Examiner* — Seyed H Azarian
(74) *Attorney, Agent, or Firm* — Buckley, Maschoff & Talwalkar LLC

(57) ABSTRACT

A system for monitoring a grade crossing is provided. The system may include a sensor co-located with a signage apparatus. The sensor may include a sensing area covering a portion of the grade crossing and a processor communicatively coupled to the sensor. The processor may be configured to receive data originating from the sensor and transmit said data to an analytics module communicatively coupled to the system.

16 Claims, 2 Drawing Sheets

SYSTEM FOR RAILWAY MONITORING

TECHNICAL FIELD

The present disclosure relates to railway monitoring. More particularly, the present disclosure relates to a system for monitoring railway tracks and/or vehicles traveling thereon.

BACKGROUND

Current grade crossings do not offer advance warning to a locomotive conductor with regards to an obstruction on a railway track on which the locomotive is travelling. An obstruction may be, for example, pedestrians or crews working in the area. In the state-of-the-art, a conductor of locomotive traveling towards a grade crossing assumes an intersection is clear. As such, grade crossings are inherently dangerous despite the presence of signage and/or gates placed to prevent pedestrians or vehicles to cross the tracks when the locomotive is approaching.

SUMMARY

The embodiments featured herein help solve or mitigate the above noted issues as well as other issues known in the art. For example, some embodiments featured herein provide video analytics and communication to the locomotive's conductor and/or to a control center to alert of any obstruction prior to locomotive entering the grade crossing. Further, in addition to video analytics or instead of video analytics, some embodiments may use other sensing modalities such as image sensing, infrared light ranging, or laser ranging to provide early detection of an obstruction. Moreover, some embodiments featured herein may be used to perform visual inspections of the locomotive itself as it travels through a grade crossing. As such, the embodiments increase the safety of grade crossing while they also provide cost reduction in locomotive maintenance as faulty components can be identified in real-time.

One exemplary embodiment provides a system for monitoring a grade crossing. The system includes a sensor co-located with a signage apparatus. The sensor has a sensing area covering a portion of the grade crossing and a processor communicatively coupled to the sensor. The processor is configured to receive data originating from the sensor and transmit said data to an analytics module communicatively coupled to the system.

Another exemplary embodiment provides a system that may be used to monitor a railway. The system may include a processor that is co-located with a signage disposed at a particular location adjacent to the railway. The system may further include a memory including instructions that, when executed by the processor, cause the processor to perform certain operations. The operations may include receiving, from a sensor coupled to the processor, data indicative of a scene associated with the rail way. The operations may also include determining from the data whether a predetermined condition has been met. Furthermore, the operations may include, in response to the predetermined condition having been met.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
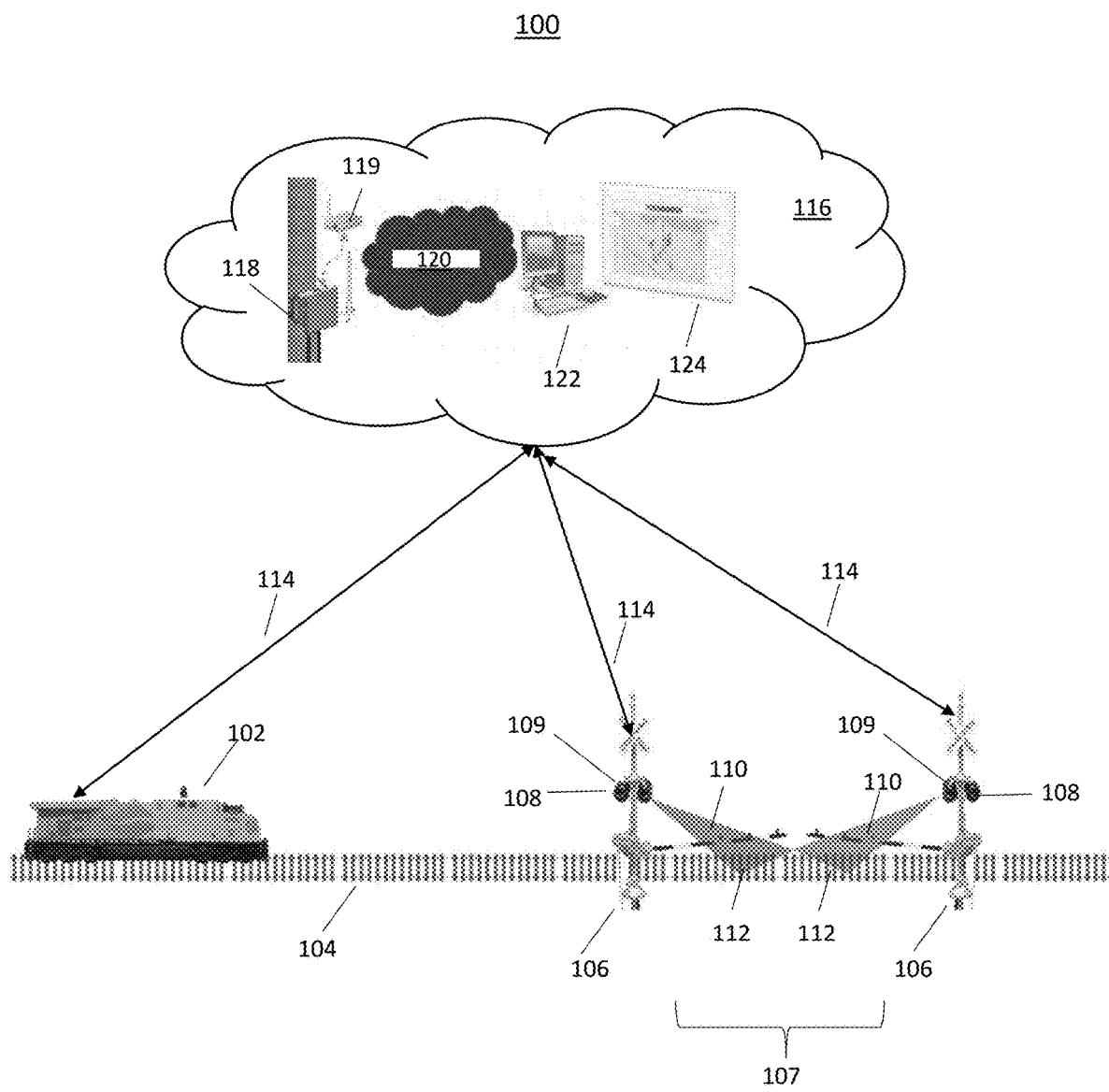
FIG. 1 illustrates a system for monitoring a railway.

FIG. 1 illustrates a system 100 according to embodiment. The system 100 may be a railway monitoring system. While the descriptions that follow are given in the context of monitoring a grade crossing 107, one of skill in the art will readily recognize that the system 100 may be used for monitoring one or more arbitrary locations along a track 104.

In a use scenario characteristic of an exemplary operation of one or more components of the system 100, a locomotive 102 may be traveling on the track 104 in the direction of the grade crossing 107. In the state-of-the-art, an engineer conducting the locomotive 102 may only be made aware of a state of the grade crossing 107 when he or she is within visual range of the grade crossing 107. As such, in the state-of-the-art, the conductor may not be able to react in time if there is an obstruction at the grade crossing 107. An obstruction may be a pedestrian illegally crossing the grade crossing 107 despite adequate warning signs that have been turned on in the signage apparatuses 106 and/or despite gates 110 having been lowered to prevent entry of the grade crossing 107 from a roadway orthogonal to the direction of the track 104.

An obstruction may also be crews or crew vehicles on the track 104 that are in the vicinity of the grade crossing 107. Furthermore, an obstruction may be debris that are at the grade crossing 107, on the track 104, and that could potential cause the locomotive 102 to derail should it hit the debris.

Each of the signage apparatuses 106 may have signage system 108 that includes one or more light sources, which may be or may incorporate light-emitting diodes. The emission cone of the light sources may be directed such that they provide a visual warning to a conductor of a vehicle or a pedestrian on the roadway orthogonal to the track 104. The signage system 108 may also include light sources that have their emission cones oriented towards the locomotive 102, in order to provide a visual cue to the conductor of the locomotive 102.

In one embodiment, each of (or one of) the signage system 108 may include a controller (as shall be described in the context FIG. 2) that is configured to actively evaluate a state of the grade crossing 107. Sensors 109 communicatively coupled to the controller may be positioned such that they sense from a region defined by a subtended volume cone 110. The sensing area or sensing region 112 of the sensors may overlap with the sensing region of other sensors associated with another controller disposed on another signage apparatus 106.

In some implementations the sensing regions 112 may be made to not overlap and focus on different portions of the grade crossing. In yet other implementations, the sensing region may be made to focus on a particular location on the locomotive 102 when it is in the vicinity of the controller. For example, a sensing region may be made to focus on the drive train of the locomotive 102 as it passes through the grade crossing 107.

A skilled artisan will recognize that the above-described controller may include a plurality of sensors, and that different subsets of sensors may be made to sense different regions of the grade crossing 107. The skilled artisan will also recognize that some subsets of sensors have sensing regions overlapping with other sensing regions, or that other subsets may be positioned with sensing regions 112 focusing on the locomotive 102 at the grade crossing 107.

The sensors may be video cameras, image sensors, infrared sensor systems or ranging systems, laser sensor or ranging systems, pressure sensors, vibration sensors, temperature sensors, motion sensors, or combinations thereof. The aforementioned list of sensors is provided as an example, and one of skill in the art will readily recognize that other types of sensors may also be used without departing from the teachings of the present disclosure. Furthermore, one of skill in the art will readily recognize that while the controller is co-located with the signage system 108, the sensors can be distributed across the grade crossing 107 and be communicatively coupled with the controller.

The controller of one or of each of the signage systems 108 may be communicatively coupled, e.g. wirelessly coupled, to a network 116 via a communication link 114. The network 116 may be a cloud that interfaces a plurality of hardware and software devices, as well as subnetworks, that cooperatively provide functionality to the system 100.

For example, the network 116 may interface the controller with a gateway device 118 and a modem 119 which can route data received from the controller to a terminal or analytics module 122 having a web-like user interface 124 via subnetwork 120. An operator (or an automated railway system) may thus analyze a status of the grade crossing 107, as reported by one or more controllers, and instruct (via another communication link 114) the conductor of the locomotive 102 to take a remedial action such as stopping the locomotive 102.

Figure 2:
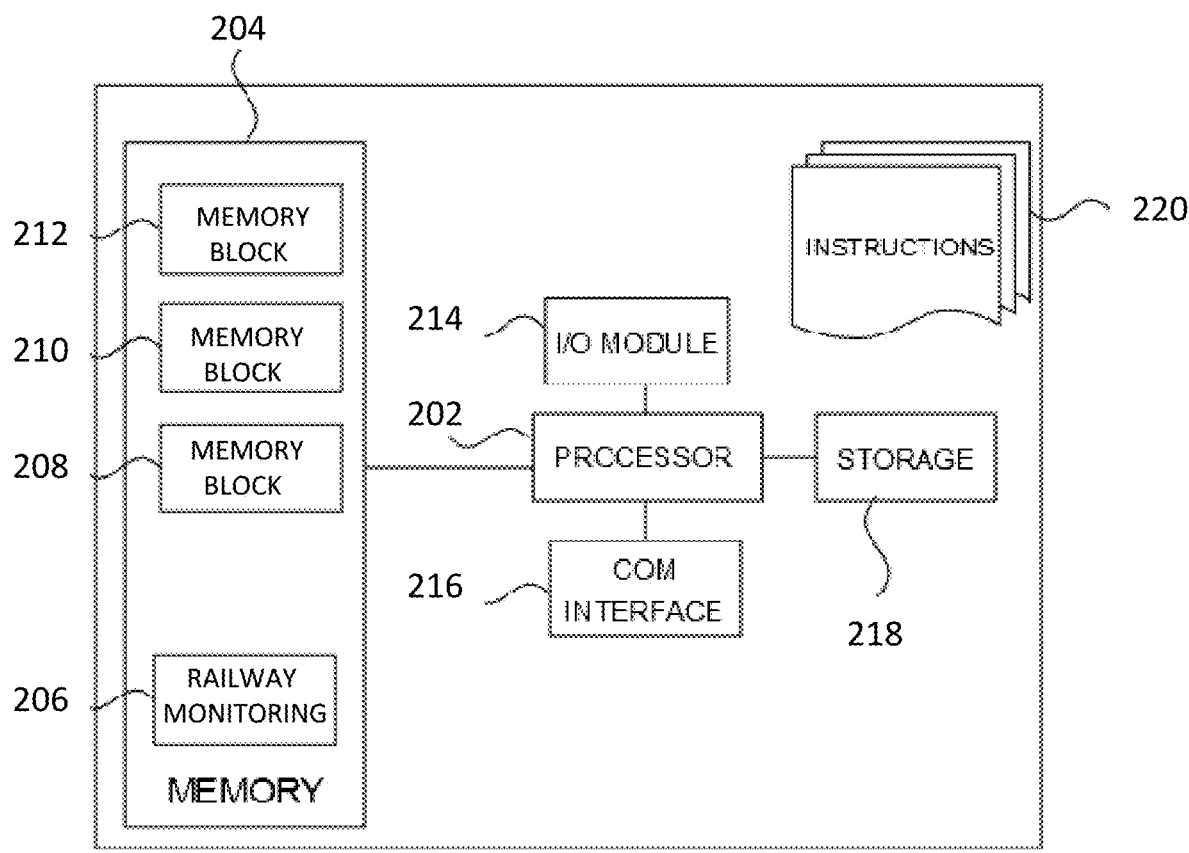
FIG. 2 shows a block diagram of a processor for a railway monitoring apparatus.

A controller 200 (or system) consistent the operation of the system 100 is described in relation to FIG. 2. FIG. 2 shows a block diagram of the controller 200 that includes a processor 202 having an application-specific structure. The specific structure can be imparted to processor 202 by instructions stored in a memory 204 included therein and/or by instructions 220 that can be fetched by processor 202 from a storage medium 218. The storage medium 218 may be co-located with the controller 200 as shown, or it may be located elsewhere and be communicatively coupled to controller 200.

The controller 200 can be a stand-alone programmable system, or it can be a programmable module located in a much larger system. For example, controller 200 can be disposed within the signage system 108 and be an integral part of it or, the controller 200 may be disposed on the signage apparatus 106.

The controller 200 may include one or more hardware and/or software components configured to fetch, decode, execute, store, analyze, distribute, evaluate, and/or categorize information. Furthermore, the controller 200 can include an input/output (I/O) module 214 that can be configured to interface with a plurality of sensors, as mentioned above in relation to FIG. 1.

The processor 202 may include one or more processing devices or cores (not shown). In some embodiments, the processor 202 may be a plurality of processors, each having either one or more cores. The processor 202 can be configured to execute instructions fetched from the memory 204, i.e. from one of memory blocks 212, 210, 208, or memory block 206, or the instructions may be fetched from the storage medium 218, or from a remote device connected to the controller 200 via a communication interface 216 that is configured to communicate with the network 116 via the link 114.

Furthermore, without loss of generality, the storage medium 218 and/or the memory 204 may include a volatile or non-volatile, magnetic, semiconductor, tape, optical, removable, non-removable, read-only, random-access, or any type of non-transitory computer-readable computer medium. The storage medium 218 and/or the memory 204 may include programs and/or other information that may be used by the processor 202. Furthermore, the storage medium 218 may be configured to log data processed, recorded, or collected during the operation of controller 200. The data may be time-stamped, location-stamped, cataloged, indexed, or organized in a variety of ways consistent with data storage practice.

In one embodiment, for example, the memory block 206 may include instructions that form a railway monitoring program. These instructions, when executed by the processor 202, cause the processor 202 to perform certain operations associated with various functions of the system 100 described above. The operations may include receiving, from a sensor coupled to the processor, data indicative of a scene associated with the rail way. The operations may also include determining from the data whether a predetermined condition has been met. Furthermore, the operations may include, in response to the predetermined condition having been met, instructing a railway system communicatively coupled to the system to take a remedial action.

Generally, the embodiments described herein may be used to monitor grade crossings and/or locomotives or wagons travelling on a rail way. In some embodiments, a monitoring system may include a plurality of sensors distributed and co-located with signage apparatuses disposed at grade crossings and/or at different locations alongside a railway.

For example, a system for monitoring a grade crossing may include a sensor 109 co-located with a signage apparatus. The sensor may have a sensing area covering a portion of the grade crossing and a processor communicatively coupled to the sensor. The processor is configured to receive data originating from the sensor and transmit said data to an analytics module communicatively coupled to the system.

The sensor 109 can be one of an image sensor or a video sensor, each of which may have a sensing area covering a portion of the grade crossing. The sensing area may be covered by the field of view of the sensor. In some embodiments, the sensor may be incorporated with the signage apparatus or in other embodiments, it may be disposed adjacent to the signage apparatus, e.g., it may be mounted on a post holding the signage apparatus. The signage apparatus may include at least one light source, which may be, for example, a light emitting diode.

The system may further include the above-mentioned analytics module. The analytics module may be configured to perform video and/or image analysis to detect edges, traffic, obstruction condition and the like. In some alternate embodiments, an exemplary system may include another sensor co-located with another signage apparatus disposed adjacent to the above-mentioned signage apparatus. The processor may then further be configured to receive additional data from the other sensor. And the other sensor may have an overlapping sensing area with the sensing area of the first sensor.

Another exemplary system may be used to monitor a railway. The system may include a processor that is co-located with a signage disposed at a particular location adjacent to the railway. The system may further include a memory including instructions that, when executed by the processor, cause the processor to perform certain operations.

The operations may include receiving, from a sensor coupled to the processor, data indicative of a scene associated with the rail way. The operations may also include determining from the data whether a predetermined condition has been met. Furthermore, the operations may include, in response to the predetermined condition having been met, instructing a railway system communicatively coupled to the system to take a remedial action.

The data received by the processor may be an image of a grade crossing, and the predetermined condition may be a characteristic of the image indicating that an obstruction being present on the railway. Or the predetermined condition may be a characteristic of the image indicating that a part of a locomotive travelling on the railway past the signage is faulty. Further, in some embodiments, determining the condition may include performing image or video analytics on the data.

As such, a remedial action may be to cause the locomotive to stop in response to an obstruction having been detected on the railway, or in response to a faulty part having been detected on the travelling locomotive. In each case, the remedial action may also include using the signage to issue a warning that a particular predetermined condition has been met. As in the case of the previously described system, the present system may include additional sensors and processors configured to perform the above-described operations cooperatively or independently.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for monitoring a grade crossing of a railway, the system comprising: a sensor disposed on or within a first signage apparatus of the railway, the sensor having a sensing area covering a portion of the grade crossing;
   a first processor communicatively coupled to the sensor, wherein the processor is configured to receive data originating from the sensor and transmit said data to an analytics module communicatively coupled to the system;
   a second processor co-located with a second signage apparatus adjacent to the first signage apparatus;
   a memory including instructions that, when executed by the first processor, cause the first processor to perform operations including:
   determining from the data whether a predetermined condition has been met, wherein the determining includes performing image analytics on the data; and
   in response to the predetermined condition having been met, instructing a railway system communicatively coupled to the system to take a remedial action.

2. The system of claim 1, wherein the sensor is one of an image sensor and a video sensor.

3. The system of claim 2, wherein the sensing area is an area of the grade crossing covered by a field of view of the sensor.

4. The system of claim 1, wherein the sensor is disposed adjacent to the signage apparatus.

5. The system of claim 1, wherein the signage apparatus includes at least one light source.

6. The system of claim 5, wherein the at least one light source is a light-emitting diode (LED).

7. The system of claim 1, wherein the system includes the analytics module.

8. The system of claim 1, further comprising another sensor co-located with another signage apparatus disposed adjacent to the signage apparatus.

9. The system of claim 8, wherein the processor is further configured to receive additional data from the other sensor.

10. The system of claim 8, wherein the other sensor has an overlapping sensing area with the sensing area.

11. A system for monitoring a railway, the system comprising:
   a first processor disposed on or within a first signage apparatus of the railway;
   a second processor co-located with a second signage apparatus adjacent to the first signage apparatus;
   a memory including instructions that, when executed by the first processor, cause the first processor to perform operations including:
   receiving, from a sensor coupled to the processor, data indicative of a scene associated with the railway, wherein the data is indicative of an image of a grade crossing;
   determining from the data whether a predetermined condition has been met, wherein the determining includes performing image analytics on the data; and
   in response to the predetermined condition having been met, instructing a railway system communicatively coupled to the system to take a remedial action.

12. The system of claim 11, wherein the predetermined condition is associated with an obstruction being present on the railway.

13. The system of claim 11, wherein the data is indicative of an image of a part of a locomotive travelling past the signage.

14. The system of claim 11, wherein the determining includes performing video analytics on the data.

15. The system of claim 11, wherein the remedial action includes causing a locomotive travelling on the railway to stop.

16. The system of claim 11, wherein the remedial action includes causing the signage to issue a warning.

* * * * *